United States Patent [19]
Coughran, Jr.

[11] 3,795,264
[45] Mar. 5, 1974

[54] TREE ACCUMULATOR ATTACHMENT FOR A TREE HARVESTER

[75] Inventor: Samuel J. Coughran, Jr., Cedartown, Ga.

[73] Assignee: Rome Industries, Cedartown, Ga.

[22] Filed: Nov. 23, 1971

[21] Appl. No.: 201,370

[52] U.S. Cl. ............................ 144/3 D, 144/34 R
[51] Int. Cl. ............................................ A01g 23/08
[58] Field of Search ......... 144/2 Z, 3 D, 34 E, 34 R

[56] References Cited
UNITED STATES PATENTS

| | | | |
|---|---|---|---|
| 3,468,352 | 9/1969 | Larson et al. | 144/34 R |
| 3,487,864 | 1/1970 | Larson et al. | 144/3 D |
| 3,277,936 | 10/1966 | Larson | 144/34 R |
| 3,102,563 | 9/1963 | Horncastle | 144/3 D |
| 3,572,411 | 3/1971 | Coughran | 144/34 R |
| 3,664,391 | 5/1972 | Coffey | 144/34 R |

FOREIGN PATENTS OR APPLICATIONS

| | | | |
|---|---|---|---|
| 163,836 | 10/1964 | U.S.S.R. | 144/3 D |

Primary Examiner—Gerald A. Dost
Attorney, Agent, or Firm—Newton, Hopkins & Ormsby

[57] ABSTRACT

A tree harvesting apparatus capable of severing and accumulating a plurality of trees. The tree harvesting apparatus includes a reciprocally operable shear blade which is operable for severing a tree adjacent the base of the tree trunk and is operable for providing a support for the butt end of a plurality of severed trees. The tree harvesting apparatus includes a tree accumulator means supported at a vertically spaced position above the shear blade. The tree accumulator means includes automatically operable tree receiving means which will permit a tree trunk to be advanced therethrough and which is detailed in dimension for engaging and retaining a plurality of tree trunks. The tree accumulator means and tree severing means are movable from a generally vertically oriented tree severing position to a tilted position with the accumulator means being movable to an open position to permit the plurality of accumulated trees to be discharged.

4 Claims, 6 Drawing Figures

//3,795,264

TREE ACCUMULATOR ATTACHMENT FOR A TREE HARVESTER

BACKGROUND OF THE INVENTION

This invention relates to a tree harvesting apparatus and more particularly is concerned with a tree harvesting apparatus which is operable for severing a tree adjacent the base of the tree trunk and operable for accumulating a plurality of severed trees in a generally upright position for transport to a remote location for discharge.

The logging industry requires the use of special crews for performing certain of the operations, particularly those such as felling, topping and delimbing, which conventionally are performed at or near the original site of the tree. In addition to the hazards involved in these operations and the inherent inefficiency of crew operations, delimbing and topping leave a residue of material which present potential dangers of insects and disease attack, as well as fire hazards.

There have been numerous attempts to devise tree harvesting apparatus which will automatically perform the tree felling operation, tree topping and delimbing operations and transport of the felled tree to a desired location. However, the prior art tree harvesting apparatus are often complex in construction and operation.

While some of the prior art tree harvesting apparatus have attempted to simplify the tree harvesting operation, these devices are unsatisfactory in that they do not provide means for removing the tree to a remote location.

Some of our modern day forestry includes trees which are planted in closely spaced rows in fields which were normally used for cultivation. In the harvesting of these trees, the prior art harvesting apparatus would shear one tree adjacent its base and would then skid the felled tree to a remote location and would then return for harvesting a second tree. The repeated trips of harvesting individual trees is time consuming resulting in an inefficiency of operation of the tree harvesting apparatus.

In the use of closely planted rows of trees, it is often desirable to thin certain of the trees while leaving still other of these trees. A number of tree shear mechanisms have been provided for shearing a tree adjacent its tree trunk and then utilizing the tree shear means for skidding the tree to a remote location. However, these prior art tree shear mechanisms would permit only one tree at a time to be severed and removed to the remote location which would again require a number of repeated trips within the area of which a tree thinning operation is being performed.

SUMMARY OF THE INVENTION

The above disadvantages of the prior art have been overcome by the present invention which basically includes a frame support means which includes means for connection to a translatable vehicle means for transport through the forest. The frame support means includes a tree severing blade which is reciprocally operable for severing a tree adjacent the base of the tree trunk. The tree severing blade is detailed in dimensions for supporting the butt ends of a plurality of severed tree trunks. The plurality of severed tree trunks are maintained in a generally vertically oriented position by means of a tree accumulator means which is attached to the frame means and vertically spaced above the tree severing blade.

An important feature of the present invention includes the automatic tree receiving means which is operable on the tree accumulator means. The automatic tree receiving means will permit a tree trunk to be advanced therethrough during forward motion of the tree harvesting apparatus while being operable to retain the tree trunk in a vertically oriented accumulated position. The tree harvesting apparatus includes control means for adjusting the tree accumulator means and the tree severing means to a tilted position for discharging the accumulated trees.

It is a primary object of the present invention to provide a tree harvesting apparatus having tree severing means which is operable for severing and supporting a plurality of tree trunks adjacent their butt end and including vertically spaced accumulator means foe engaging and retaining the plurality of severed tree trunks.

A further object of the present invention is to provide a tree accumulator means which is automatically operable for receiving a tree trunk in response to forward motion of the tree harvesting apparatus.

Another object of the present invention is to provide a tree harvesting apparatus with accumulator means which is movable to a tilted position and operable for discharging a plurality of accumulated trees.

An additional object of the present invention is to provide a tree harvesting apparatus including tree severing means and tree accumulating means which is simple in construction and operation, economical to manufacture and reliable in performance.

These and other objects and advantages of the details of construction will become apparent upon reading the following description of the illustrative embodiment of a tree harvesting apparatus embodying the principles of the present invention with reference to the attached drawings wherein like reference numerals have been used to refer to like parts throughout the several figures, and wherein:

DESCRIPTION OF THE ILLUSTRATIVE EMBODIMENT

Referring now particularly to the drawings, the illustrative embodiment embodying the principles of the present invention will be described with reference to a tractor support vehicle 10, carrier frame means 21, tree shearing means 20 and tree accumulator means 50.

Figure 1:
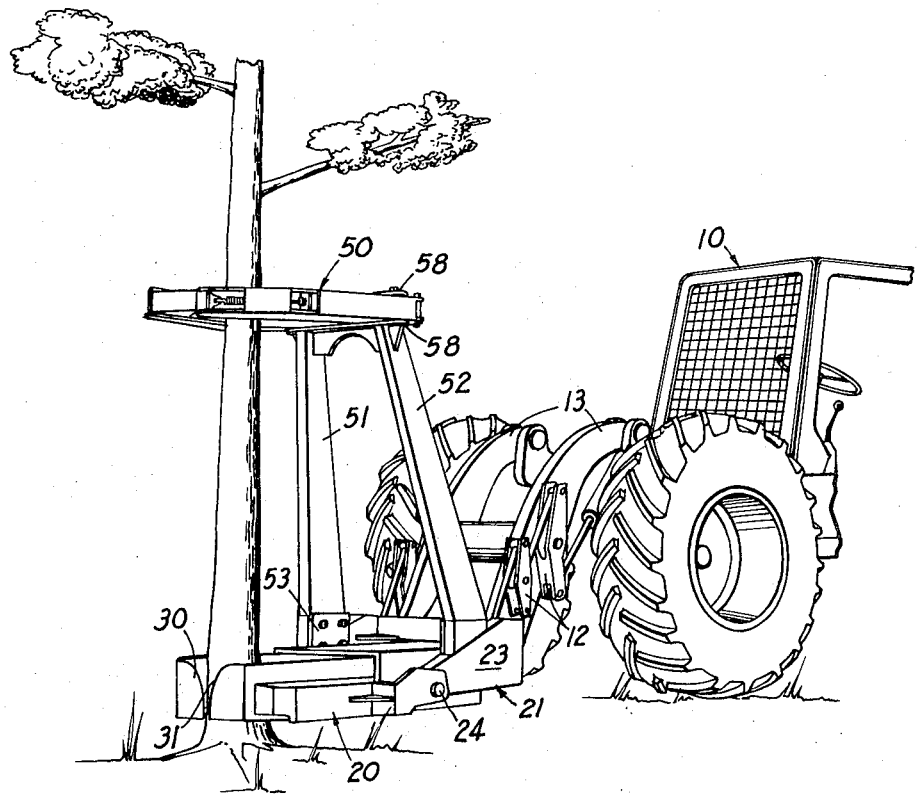
FIG. 1 is a perspective view of the tree harvesting apparatus embodying the principles of the present invention shown in position adjacent a standing tree.

As shown in FIG. 1, the tractor support vehicle 10 is of conventional construction having a number of hydraulically operated linkage control mechanisms 12. The vehicle linkage control mechanisms are operable for effecting operation of a support frame 13. The supporting frame 13 defines transverse pivot support means (not shown) for attachment to the tree shearing means, as will be described in more detail hereinbelow.

Figure 2:
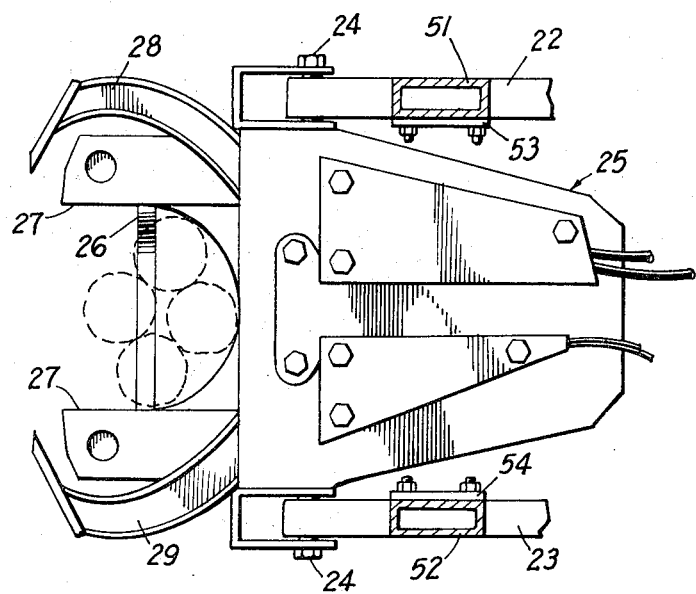
FIG. 2 is an enlarged plan view of the tree harvesting apparatus tree severing means, with certain parts broken away and certain parts omitted for purpose of clarity.

As shown in FIGS. 1 and 2, the tree shearing means includes a carrier frame 21 which is constructed in the form of a substantially U-shaped frame having a base portion which is pivotally mounted to the vehicle frame means 13 for pivotal movement about the transverse pivot means (not shown). Extending forwardly from the U-shaped frame 21 is a pair of parallel arranged legs 22, 23. The forward end of legs 22, 23 defines a second transverse pivot means 24 for pivotally receiving the tree shearing frame assembly 25.

Tree shearing frame assembly 25 includes a shear blade 26 mounted for reciprocating movement from a rearwardly retracted inoperable position to a forwardly extended cutting position within a notched tree receiving frame element 27. The tree shear frame assembly 25 also includes a pair of arms 28, 29 which are pivotally supported on the tree shear frame assembly 25 for movement about laterally spaced vertical axis (not shown).

Arms 28, 29 are operable for movement from an open position allowing a tree to be received within the notched cutting area of frame elements 27 and movable to a closed position, surrounding the back side of the tree, to provide a backup means for the shear blade 26. Arms 28, 29 are provided with upwardly projecting tree grasping elements 30, 31, respectively, which are detailed to be selectively engaged with the tree trunk of a fallen tree for use in skidding the tree to a remote location.

The tree shearing frame assembly 25 is supported on the tractor vehicle support frame 13 for adjustment about the first mentioned horizontal axis by conventional control means (not shown). The tree shear frame assembly 25 is also supported on the carrier frame 21 and controlled for movement about the second transverse axis 24 by conventional hydraulic actuating means (not shown). Shear blade 26 is supported and operable during reciprocating movement by hydraulic control cylinder means. Arms 28, 29 are also provided with hydraulic control means operable from the vehicle 10 for effecting movement of the arms between their operative and inoperative position. Reference is made to U.S. Pat. No. 3,572,411 issued Mar. 23, 1971, for a Tree Harvesting Apparatus for the details of construction of the tree shearing blade 26, the backup arm means 28, 29; and, for the details of construction and operation of the vehicle control frame means 12, carrier frame means 21 and tree shearing frame assembly 25.

As shown in FIG. 1, the tree accumulator means is generally represented by the reference numeral 50 and includes a pair of vertically extending leg members 51, 52. Leg members 51, 52 are attached to the carrier frame 21 by means of a conventional plate and bolt connecting means 53, 54. The upper extended ends of legs 51, 52 are connected to each other by a transverse horizontally extending frame element 55. Frame element 55 is provided with oppositely extending, vertically spaced pairs of plate elements 57, 58. The plate elements 57 are vertically spaced to define a support therebetween for a first accumulator arm 59. Accumulator arm 59 is pivotally supported between plates 57 by a pivot pin means 60. Plate elements 58 define a pivot support means for a second accumulator arm 61. The accumulator arm 61 is pivotally supported between plate elements 58 by pivot pin means 62.

Figure 3:
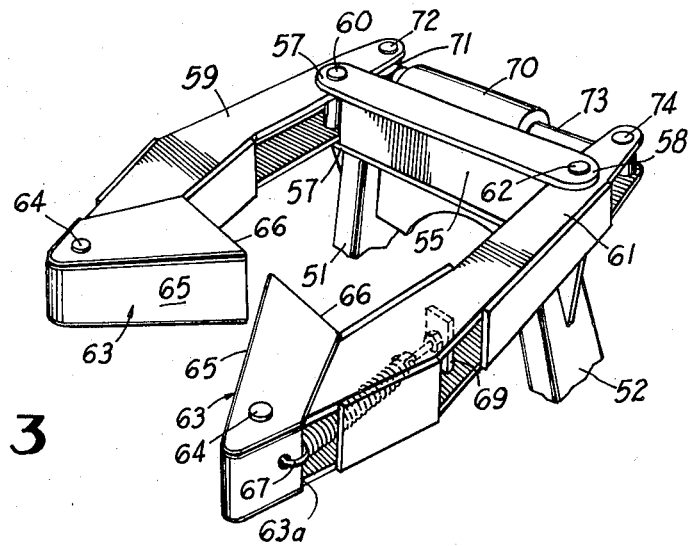
FIG. 3 is an enlarged fragmentary perspective view of the tree harvesting apparatus of FIG. 1 showing the details of construction of the tree accumulator means.
Figure 5:
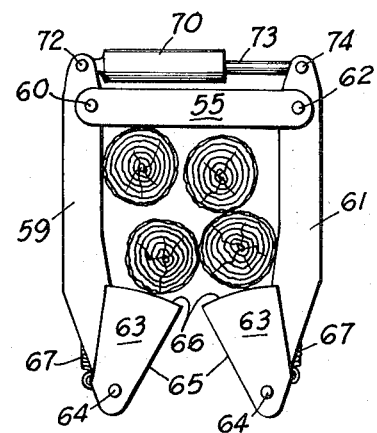
FIG. 5 is a schematic plan view of the tree accumulator means shown in FIG. 4 having a number of tree trunks retained therein; and, FIG. 6 is a schematic view showing the tree accumulator means moved to a tilted position and open for discharging the accumulated trees.

Each of the accumulator means 59, 61 includes a forwardly extending end portion which is provided with an automatically operable tree receiving and retaining lug means 63. The tree receiving and retaining lug means 63 are pivotally attached to the forward ends of arms 59, 61 by conventional pin connecting means 64. Each of the pivotally mounted lug means 63 includes an angle camming surface 65 and a transversely oriented tree retaining surface 66. The lug means 63 are normally spring biased to an outwardly extending position, as shown in FIGS. 3 and 5, by means of tension spring means 67. The tension spring means 67 are connected adjacent one of their ends to an aperture formed in lug means 63 and is connected at an opposite end to an upstanding plate member 69 which is fixed to the accumulator arms 59 and 61.

Figure 4:
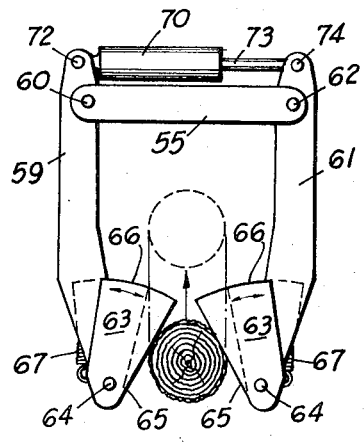
FIG. 4 is a schematic plan view showing the tree accumulator means in operation during advancement of the tree harvester into engagement with a tree trunk.

Lugs 63 are stopped in an outwardly extended limit stop or tree retaining position by engagement of backing plate elements 63a, formed on the lugs, with the outer lateral edge portions of the arms 59, 61. In an assembled position, as shown in FIGS. 3–5, the camming surface 65 of the pair of lugs are inwardly converging to define a V-shaped tree receiving slot. The lugs 63 are automatically movable to a pivotally displaced tree receiving position, as shown in dotted lines of FIG. 4, by engagement of camming portions 65 with a tree trunk and by forwardly advancing the tree accumulator means relative to the tree trunk. After the tree trunk has passed the tree receiving lug means 63, the spring tension means 67 will automatically move the tree receiving lug means 63 to the outwardly displaced limit position.

As shown in FIG. 5, the tree accumulator means 50, including the dimensions of the transverse frame means 55 and accumulator arms 59, 61, are detailed for defining a cavity area capable of receiving and retaining a plurality of tree trunks.

Figure 6:
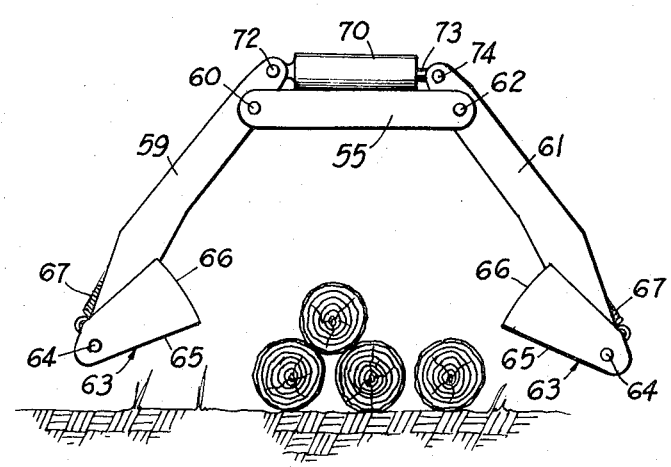

The tree accumulator arms 59, 61 are movable from a closed position as shown in FIGS. 3–5 to an open tree discharging position, as shown in FIG. 6, by means of a hydraulic cylinder 70. The hydraulic cylinder 70 includes a base end 71 which is connected by conventional pivot pin means 72 to a rearwardly directed end portion of arm 59. Cylinder 71 includes a piston rod element 73 which is pivotally connected at its extended end by pivot pin means 74 to a rearwardly directed end portion of accumulator arm 61. The cylinder 70 is controlled by conventional supply lines (not shown) which will furnish a supply of hydraulic fluid under pressure from the vehicle 10 for effecting movement of the accumulator arms 59, 61 from the closed tree retaining position (FIG. 5) to the open discharge position (FIG. 6).

OPERATION

In utilizing the above described tree harvesting apparatus embodying the principles of the present invention, the translatable vehicle means 10 is maneuvered into position adjacent a standing tree, as shown in FIG. 1, with the tree shear mechanism 20 supported in a substantially horizontal position. To begin a tree harvesting operation, the backup arm means 28, 29 are moved to an open position, as shown in FIG. 2, to allow a standing tree trunk to enter the notched area formed by the frame elements 27. After a tree has been received within the notched area, the arms 28, 29 are moved to a closed position, as shown in FIG. 1, to surround the tree trunk and provide backup means for the shear blade. During forward motion of the tree harvesting apparatus into position to receive the tree trunk within the notched area of the frame elements 27, the tree trunk will move into position in engagement with the lug means 63. As the tree harvester is advanced forward to receive the tree trunk into position within a notched area, the tree trunk will contact the camming surfaces 65 thereby moving the lug means 63 to an adjusted position to permit the tree trunk to be received within the cavity area formed between the accumulator arms 59, 60.

A tree severing operation is performed by effecting movement of the shear blade 26 outwardly within the notched area. As the shear blade 26 moves outwardly, it will shear the tree trunk adjacent the base of the tree. After a tree trunk has been severed by shear blade 26, the shear blade will remain in an extended position to provide a support for the butt end of the severed tree. The tree harvesting apparatus is then moved into position with a second tree located adjacent the outside surfaces of the backup arms 28, 29 and in direct alignment with the notched area formed by frame elements 27. After the second tree has been properly positioned adjacent the notched area 27, the arms 28, 29 are moved to an open position and the tree harvesting apparatus is advanced forward slowly. As the tree harvesting apparatus is advanced forward, the second tree will enter the notched area formed by frame elements 27 and will shift the butt end of the first severed tree rearwardly on the shear blade 26. As the second standing tree contacts the cutting edge of the shear blade 26, the shear blade will be retracted an amount sufficient to allow the second standing tree to enter the notched area whereby the arms 28, 29 can be moved to a position around the tree, as shown in FIG. 1. During the advancement of the second tree within the notched area 27, the upper portion of the tree trunk will be automatically received within the accumulator arm means 59, 61 and will be retained therein by the lug members 63.

With the second standing tree supported in position within the notched area adjacent blade 26 and the backup arms in position surrounding the back of the tree, the shear blade 26 will again be operated to move forward to shear the second standing tree and will remain in the forward extended position to provide a support for the butt end of the two severed trees. The two severed trees will be supported by the shear blade 26 and retained thereon by the accumulator means 50. The tree harvesting apparatus will then be moved in position for harvesting still a third tree in the same manner as described hereinabove. After a number of trees have been harvested which can be effectively supported by the shear blade means 26 and can be retained within the accumulator means 50, the tree harvesting apparatus is then maneuvered to a remote location by the translatable vehicle means 10. With the tree harvesting apparatus positioned in an area where it is desired to discharge the trees, the tree harvesting apparatus is then adjusted from the substantially upright position as shown in FIG. 1, to a position wherein the tree trunks are substantially horizontally oriented relative to the ground. The accumulator arm means 59, 61 are then adjusted to an open discharge position, as shown in FIG. 6, wherein the accumulated trees will fall therefrom by gravity. Simultaneously with the opening of the accumulator arms 59, 61, the arm members 28, 29 of the tree severing means 20 can be moved to an open position to permit the butt ends of the supported trees to be easily displaced from the shear blade 26. After the first group of accumulated trees are discharged in a manner described hereinabove, the tree harvesting apparatus is then adjusted to the vertically oriented position and maneuvered to a position within the forest for severing and accumulating still another group of trees.

It now becomes apparent that the above described tree harvesting apparatus embodying the principles of the present invention is capable of obtaining the above stated objects and advantages. It is obvious that those skilled in the art may make modifications in the details of construction without departing from the spirit of the invention which is to be limited only by the scope of the appended claims.

What is claimed is:

1. Tree harvesting and accumulating means comprising a vehicle, a carrier frame mounted on said vehicle for movement about a horizontal pivot, a tree shearing assembly mounted on said carrier frame for movement about a second horizontal pivot, said tree shearing assembly comprising a shear blade mounted for reciprocal movement substantially in the plane of said second pivot, means for reciprocating said shear blade, a pair of pivoted curved arms mounted on said tree shearing assembly and adapted to be moved from an open position in which they are capable of receiving a plurality of tree trunks to a closed position in which they engage a tree trunk so received and provide backup means for said shear blade, tree accumulator means spaced above said shear blade assembly and supported on said carrier frame, said tree accumulator means comprising frame means for defining an open area of a size to receive and retain a plurality to tree trunks having their butt ends solely supported on said shear blade, said frame means including means adapted to be engaged and moved apart by a tree trunk to permit the trunk to enter said open area, said last-mentioned means being biased to move toward each other after passage of a tree trunk to retain the trunk in said area, and means for moving said last-mentioned means apart sufficiently to permit the discharge of a plurality of tree trunks from said area.

2. Tree harvesting and accumulating means as in claim 1 wherein said tree accumulator means is supported above said shearing assembly by a pair of vertically extending leg members and comprises a pair of arms mounted for pivotal movement at opposite ends of a horizontal connecting member and a hydraulic piston and cylinder connected to said arms and adapted to move them from a closed tree receiving position to an open tree releasing position.

3. Tree harvesting and accumulating means as in claim 2 wherein said arms are pivoted to said connecting member intermediate their ends and said piston and cylinder are connected to ends of said respective arms.

4. Apparatus as in claim 3 wherein said carrier frame is adapted to be moved from a vertical tree accumulating position to a horizontal tree discharging position.

* * * * *